United States Patent
Bobe et al.

(10) Patent No.: US 11,216,830 B1
(45) Date of Patent: Jan. 4, 2022

(54) MOBILE COMMUNICATION DEVICE LOCATION DATA ANALYSIS SUPPORTING BUILD-OUT DECISIONS

(71) Applicant: T-Mobile Innovations LLC, Overland Park, KS (US)

(72) Inventors: Brooke M. Bobe, Overland Park, KS (US); Naseer A. Dari, Kansas City, KS (US); Matthew Habiger, Kansas City, KS (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 348 days.

(21) Appl. No.: 16/379,774

(22) Filed: Apr. 9, 2019

(51) Int. Cl.
 *H04W 4/02* (2018.01)
 *G06Q 30/02* (2012.01)
 *G01C 21/20* (2006.01)
 *H04W 4/021* (2018.01)
 *H04W 4/029* (2018.01)

(52) U.S. Cl.
 CPC ......... *G06Q 30/0201* (2013.01); *G01C 21/20* (2013.01); *H04W 4/021* (2013.01); *H04W 4/029* (2018.02)

(58) Field of Classification Search
 CPC .. G06Q 30/0201; H04W 4/029; H04W 4/021; G01C 21/20
 USPC .......................................................... 702/150
 See application file for complete search history.

(56) References Cited

U.S. PATENT DOCUMENTS

| 6,486,861 | B1 | 11/2002 | Preas et al. |
| 7,221,287 | B2 | 5/2007 | Gueziec et al. |
| 8,391,836 | B1 | 3/2013 | Bolot et al. |
| 8,589,318 | B2 | 11/2013 | Sundararajan et al. |
| 9,122,693 | B2 | 9/2015 | Blom et al. |
| 9,171,461 | B1 | 10/2015 | Dabell |

(Continued)

FOREIGN PATENT DOCUMENTS

| GB | 2516513 A | 1/2015 |
| WO | 03051478 A1 | 6/2003 |

OTHER PUBLICATIONS

Final Office Action dated Oct. 7, 2020, U.S. Appl. No. 15/838,016, filed Dec. 11, 2017.

(Continued)

*Primary Examiner* — Mohamed Charioui
*Assistant Examiner* — Christine Y Liao

(57) ABSTRACT

A method of analyzing location data of mobile communication devices. The method comprises determining a dwell time of each of a plurality of mobile communication devices in location clusters associated with each device by an application that executes on a computer, determining a centroid of the location clusters by the application, for each of the plurality of mobile communication devices, determining by the application centroids of the location clusters associated with the mobile communication device that are located within a predefined geometry, analyzing by the application the dwell times of mobile communication devices in the predefined geometry based on the determination of centroids that are located within the predefined geometry, and building a building traffic flow survey by the application based on the analysis of dwell times of mobile communication devices in the predefined geometry.

20 Claims, 6 Drawing Sheets

(56) References Cited

U.S. PATENT DOCUMENTS

| | | |
|---|---|---|
| 9,326,096 B1 | 4/2016 | Gatmir-Motahari et al. |
| 9,408,037 B1 | 8/2016 | Alizadeh-Shabdiz et al. |
| 9,710,873 B1 | 7/2017 | Hill |
| 10,300,846 B2 | 5/2019 | Suzuki et al. |
| 10,332,151 B2 | 6/2019 | Megdal |
| 10,459,964 B2 | 10/2019 | Mei et al. |
| 10,469,981 B1 | 11/2019 | Dannamaneni et al. |
| 10,555,130 B1 | 2/2020 | Burcham et al. |
| 10,645,531 B1 | 5/2020 | Burcham et al. |
| 10,657,806 B1 | 5/2020 | Burcham et al. |
| 10,694,321 B1 | 6/2020 | Burcham et al. |
| 10,715,950 B1 | 7/2020 | Burcham et al. |
| 10,715,964 B1 | 7/2020 | Burcham et al. |
| 10,911,888 B1 | 2/2021 | Burcham et al. |
| 11,067,411 B1 | 7/2021 | Burcham et al. |
| 2002/0055900 A1 | 5/2002 | Kansal |
| 2002/0188550 A1 | 12/2002 | Swartz et al. |
| 2003/0023698 A1 | 1/2003 | Dieberger et al. |
| 2004/0254698 A1 | 12/2004 | Hubbard et al. |
| 2006/0100956 A1 | 5/2006 | Ryan et al. |
| 2006/0229939 A1 | 10/2006 | Bhakta et al. |
| 2007/0191029 A1 | 8/2007 | Zarem et al. |
| 2008/0201305 A1 | 8/2008 | Fitzpatrick et al. |
| 2008/0248815 A1 | 10/2008 | Busch |
| 2009/0150217 A1 | 6/2009 | Luff |
| 2009/0210287 A1 | 8/2009 | Chickering et al. |
| 2009/0319177 A1 | 12/2009 | Khosravy et al. |
| 2010/0094867 A1 | 4/2010 | Badros et al. |
| 2010/0279708 A1 | 11/2010 | Lidsrom et al. |
| 2011/0090080 A1* | 4/2011 | Yu .................. G06Q 30/0201 340/539.13 |
| 2012/0005532 A1 | 1/2012 | Li et al. |
| 2012/0008526 A1 | 1/2012 | Borghei |
| 2012/0013806 A1 | 1/2012 | Hsieh |
| 2012/0040637 A1 | 2/2012 | Wigren |
| 2012/0078733 A1 | 3/2012 | Visinoni et al. |
| 2012/0163206 A1* | 6/2012 | Leung .................. G01S 3/023 370/252 |
| 2013/0262479 A1* | 10/2013 | Liang .................. H04W 4/021 707/748 |
| 2013/0267255 A1 | 10/2013 | Liu et al. |
| 2014/0122220 A1 | 5/2014 | Bradley et al. |
| 2014/0258201 A1* | 9/2014 | Finlow-Bates .......... G06N 5/02 706/46 |
| 2014/0279026 A1 | 9/2014 | Nath et al. |
| 2015/0029176 A1 | 1/2015 | Baxter et al. |
| 2015/0051829 A1 | 2/2015 | Gearhart et al. |
| 2015/0051957 A1 | 2/2015 | Griebeler et al. |
| 2015/0081617 A1 | 3/2015 | Shaik et al. |
| 2015/0088423 A1 | 3/2015 | Tuukkanen |
| 2015/0106011 A1 | 4/2015 | Nesbitt |
| 2015/0146917 A1 | 5/2015 | Bernal et al. |
| 2015/0149285 A1 | 5/2015 | Schroeter |
| 2015/0201298 A1 | 7/2015 | Zhang et al. |
| 2015/0204680 A1 | 7/2015 | Lee et al. |
| 2015/0278868 A1 | 10/2015 | O'Conner et al. |
| 2015/0310502 A1 | 10/2015 | Tang et al. |
| 2015/0382139 A1* | 12/2015 | Omar .................. G01S 5/0294 455/456.1 |
| 2016/0076908 A1 | 3/2016 | Pang et al. |
| 2016/0180392 A1 | 6/2016 | Liu et al. |
| 2016/0330589 A1 | 11/2016 | Tuukkanen |
| 2016/0367899 A1 | 12/2016 | Boncyk |
| 2017/0068001 A1 | 3/2017 | Chhokra et al. |
| 2017/0124472 A1 | 5/2017 | Fu et al. |
| 2017/0153113 A1 | 6/2017 | Gotoh et al. |
| 2017/0185806 A1 | 6/2017 | Kong et al. |
| 2017/0187788 A1 | 6/2017 | Botea et al. |
| 2017/0213240 A1 | 7/2017 | Waldron et al. |
| 2017/0223497 A1 | 8/2017 | Wang |
| 2017/0277716 A1 | 9/2017 | Giurgiu et al. |
| 2017/0301220 A1 | 10/2017 | Jarrell et al. |
| 2018/0014161 A1* | 1/2018 | Warren ................ H04W 4/023 |
| 2018/0059669 A1 | 3/2018 | Madigan et al. |
| 2018/0114251 A1 | 4/2018 | Zavesky et al. |
| 2018/0197204 A1 | 7/2018 | Wan et al. |
| 2018/0240026 A1 | 8/2018 | Pietrobon et al. |
| 2018/0259356 A1 | 9/2018 | Rolf et al. |
| 2018/0266829 A1 | 9/2018 | Frtiz et al. |
| 2018/0283896 A1 | 10/2018 | Piemonte et al. |
| 2018/0330403 A1 | 11/2018 | Olivieri |
| 2019/0108548 A1 | 4/2019 | Gaither |
| 2019/0220898 A1 | 7/2019 | Rhodes et al. |
| 2019/0347679 A1 | 11/2019 | Banerjee et al. |
| 2020/0184609 A1 | 6/2020 | Meagher |

OTHER PUBLICATIONS

Advisory Action dated Nov. 30, 2020, U.S. Appl. No. 15/838,016, filed Dec. 11, 2017.

Office Action dated Jan. 26, 2021, U.S. Appl. No. 15/838,016, filed Dec. 11, 2017.

FAIPP Pre-Interview Communication dated Feb. 3, 2021, U.S. Appl. No. 16/379,781, filed Apr. 9, 2019.

Notice of Allowance dated Mar. 31, 2021, U.S. Appl. No. 16/379,781, filed Apr. 9, 2019.

Notice of Allowance dated Sep. 28, 2020, U.S. Appl. No. 16/860,719, filed Apr. 28, 2020.

Office Action dated Apr. 15, 2020, U.S. Appl. No. 15/838,016, filed Dec. 11, 2017.

Final Office Action dated Jul. 28, 2020, U.S. Appl. No. 15/838,016, filed Dec. 11, 2017.

Notice of Allowance dated Mar. 16, 2020, U.S. Appl. No. 16/714,277, filed Dec. 13, 2019.

Burcham, Robert H., et al., "Pattern Matching in Point-of-Interest (POI) Traffic Analysis," filed Apr. 28, 2020, U.S. Appl. No. 16/860,719.

Notice of Allowance dated Mar. 12, 2020, U.S. Appl. No. 16/398,258, filed Apr. 29, 2019.

Restriction Requirement dated Jan. 23, 2019, U.S. Appl. No. 15/944,512, filed Apr. 3, 2018.

FAIPP Pre-Interview Communication dated May 28, 2019, U.S. Appl. No. 15/944,512, filed Apr. 3, 2018.

Notice of Allowance dated Jul. 10, 2019, U.S. Appl. No. 15/944,512, filed Apr. 3, 2018.

FAIPP Pre-Interview Communication dated Aug. 28, 2019, U.S. Appl. No. 16/398,258, filed Apr. 29, 2019.

Dannamaneni, Prashanth, et al., "Mobile Phone Mobile Viewshed Analysis," filed Apr. 3, 2018, U.S. Appl. No. 15/944,512.

Burcham, Robert H., et al., "Adapting Content Presentation Based on Mobile Viewsheds," filed Dec. 11, 2017, U.S. Appl. No. 15/838,016.

Burcham, Robert, H., et al., "Route Building Engine Tuning Framework", filed Apr. 29, 2019, U.S. Appl. No. 16/398,254.

Burcham, Robert H., et al. "Point of Interest (POI) Definition Tuning Framework" filed Apr. 29, 2019, U.S. Appl. No. 16/398,258.

Burcham, Robert H., et al., "System and Method of Mobile Phone Location in a Subway Transit Environment," filed Apr. 9, 2019, U.S. Appl. No. 16/379,791.

Burcham, Robert H., et al., "Pre-processing of Mobile Communications Device Geolocations According to Travel Mode in Traffice Analysis," filed Apr. 9, 2019, U.S. Appl. No. 16/379,784.

Burcham, Robert H., et al., "Transformation of Point of Interest Geometries to Lists of Route Segments in Mobile Communication Device Traffic Analysis," filed Apr. 9, 2019, U.S. Appl. No. 16/379,786.

Burcham, Robert H., et al., "Pattern Matching in Point-of-Interest (POI) Traffic Analysis," filed Apr. 9, 2019, U.S. Appl. No. 16/379,789.

Burcham, Robert H., et al., "System and Method of Mobile Phone Location in a Subway Transit Environment," filed Apr. 9, 2019, U.S. Appl. No. 16/379,781.

FAIPP Pre-Interview Communication dated Jan. 28, 2020, U.S. Appl. No. 15/838,016, filed Dec. 11, 2017.

Restriction Requirement dated Feb. 21, 2020, U.S. Appl. No. 15/838,016, filed Dec. 11, 2017.

Restriction Requirement dated Nov. 15, 2019, U.S. Appl. No. 16/398,254, filed Apr. 29, 2018.

Notice of Allowance dated Jan. 10, 2020, U.S. Appl. No. 16/398,254, filed Apr. 29, 2018.

(56) References Cited

OTHER PUBLICATIONS

Notice of Allowance dated Jan. 17, 2020, U.S. Appl. No. 16/379,786, filed Apr. 9, 2019.
Notice of Allowance dated Feb. 18, 2020, U.S. Appl. No. 16/379,798, filed Apr. 9, 2019.
Notice of Allowance dated Oct. 2, 2019, U.S. Appl. No. 16/379,784, filed Apr. 9, 2019.
FAIPP Office Action dated Nov. 13, 2019, U.S. Appl. No. 16/398,258, filed Apr. 29, 2019.
Burcham, Robert H., et al., "Pre-processing of Mobile Communications Device Geolocations According to Travel Mode in Traffice Analysis," filed Dec. 13, 2019, U.S. Appl. No. 16/714,277.
Final Office Action dated May 13, 2021, U.S. Appl. No. 15/838,016, filed Dec. 11, 2017.
Notice of Allowance dated Oct. 4, 2021, U.S. Appl. No. 15/838,016, filed Dec. 11, 2017.
Alt, et al.; Advertising on Public Display Networks; IEEE Computer Society 2012; pp. 50-56; 2012.
Froelich; Visual Presentation Challenges for Mobile Spatial Applications: Three Case Studies; IEEE 2008; pp. 533-538; 2008.
Santos; Using Pervasvie Computing Technologies to Deliver Personal and Public Ads in Public Places; Politechnical Institute de Castelo Branco Portugal; 3 pages; 2008.

* cited by examiner

MOBILE COMMUNICATION DEVICE LOCATION DATA ANALYSIS SUPPORTING BUILD-OUT DECISIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are commonly carried by adults in the United States, and location data determined from the mobile devices can be utilized as a proxy for the location of the associated adults. This location data can be collected, analyzed, and processed with models to glean anonymized information that both protects the privacy of the wireless communication subscribers but still provides valuable information about the subscribers.

SUMMARY

In an embodiment, a method of analyzing wireless communication service subscriber traffic and apportioning the traffic to proximate organizations located within a point of interest (POI) to build a multi-dimensional information map and condense a large amount of data to promote efficient use of the data is disclosed. The method comprises, for each of a plurality of mobile communication devices, analyzing a plurality of location fixes of the mobile communication device by an application executing on a computer system and for each of the plurality of mobile communication devices, determining a plurality of location clusters of the mobile communication device by the application based on analyzing the location fixes of the mobile communication device. The method further comprises, for each of the plurality of mobile communication devices, determining a centroid of the location clusters associated with the mobile communication device by the application and for each of the plurality of mobile communication devices, determining by the application centroids of the location clusters associated with the mobile communication device that are located within a predefined geometry, wherein a plurality of organizations are located within the predefined geometry. The method further comprises, for each of the plurality of mobile communication devices associated with a location cluster centroid located within the predefined geometry, determining an attribution of a communication service subscriber traffic associated with that mobile communication device by the application to at least one of the plurality of organizations located within the predefined geometry and, based on the attribution of the communication subscriber traffic associated with each of the plurality of mobile communication devices associated with a location cluster centroid located within the predefined geometry, generating a survey of wireless communication subscriber traffic within the predefined geometry by the application, wherein the survey comprises statistics of subscriber traffic in at least one of the plurality of organizations located within the predefined geometry, whereby the at least one organization takes action based on the survey.

In another embodiment, a computer system for analyzing wireless communication service subscriber traffic and apportioning the traffic to proximate organizations located within a point of interest (POI) is disclosed. The computer system comprises a processor, a memory, and an application stored in the memory. When executed by the processor, the application, for each of a plurality of mobile communication devices, analyzes a plurality of location fixes of the mobile communication device, for each of the plurality of mobile communication devices, determines a plurality of location clusters of the mobile communication device based on analyzing the location fixes of the mobile communication device, and for each of the plurality of mobile communication devices, determines a centroid of the location clusters associated with the mobile communication device. The application further, for each of the plurality of mobile communication devices, determines centroids of the location clusters associated with the mobile communication device that are located within a predefined geometry, wherein a plurality of organizations are located within the predefined geometry, for each of the plurality of mobile communication devices associated with a location cluster centroid located within the predefined geometry, determines an attribution of a communication service subscriber traffic associated with that mobile communication device to at least one of the plurality of organizations located within the predefined geometry, and based on the attribution of the communication subscriber traffic associated with each of the plurality of mobile communication devices associated with a location cluster centroid located within the predefined geometry, generates a survey of wireless communication subscriber traffic within the predefined geometry, wherein the survey comprises statistics of subscriber traffic in at least one of the plurality of organizations located within the predefined geometry, whereby the at least one organization takes action based on the survey.

In yet another embodiment, a method of analyzing location data of mobile communication devices to produce building traffic flow survey is disclosed. The method comprises defining a location point located within a building and a geometry containing the location point in a metadata file, for each of a plurality of mobile communication devices, analyzing a plurality of location fixes of the mobile communication device by an application executing on a computer system, and for each of the plurality of mobile communication devices, determining a plurality of location clusters of the mobile communication device by the application based on analyzing the location fixes of the mobile communication device. The method further comprises, for each of the plurality of mobile communication devices, determining a dwell time of the mobile communication device in each of the location clusters of the mobile communication device by the application, for each of the plurality of mobile communication devices, determining a centroid of the location clusters associated with the mobile communication device by the application, and for each of the plurality of mobile communication devices, determining by the application centroids of the location clusters associated with the mobile communication device that are located within the geometry defined in the metadata file. The method further comprises analyzing by the application the dwell times of mobile communication devices in the geometry defined in the metadata file based on the determination of centroids that are located within the geometry defined in the metadata file and building a building traffic flow survey by the application based on the analysis of dwell times of mobile communication devices in the geometry defined in the metadata file.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
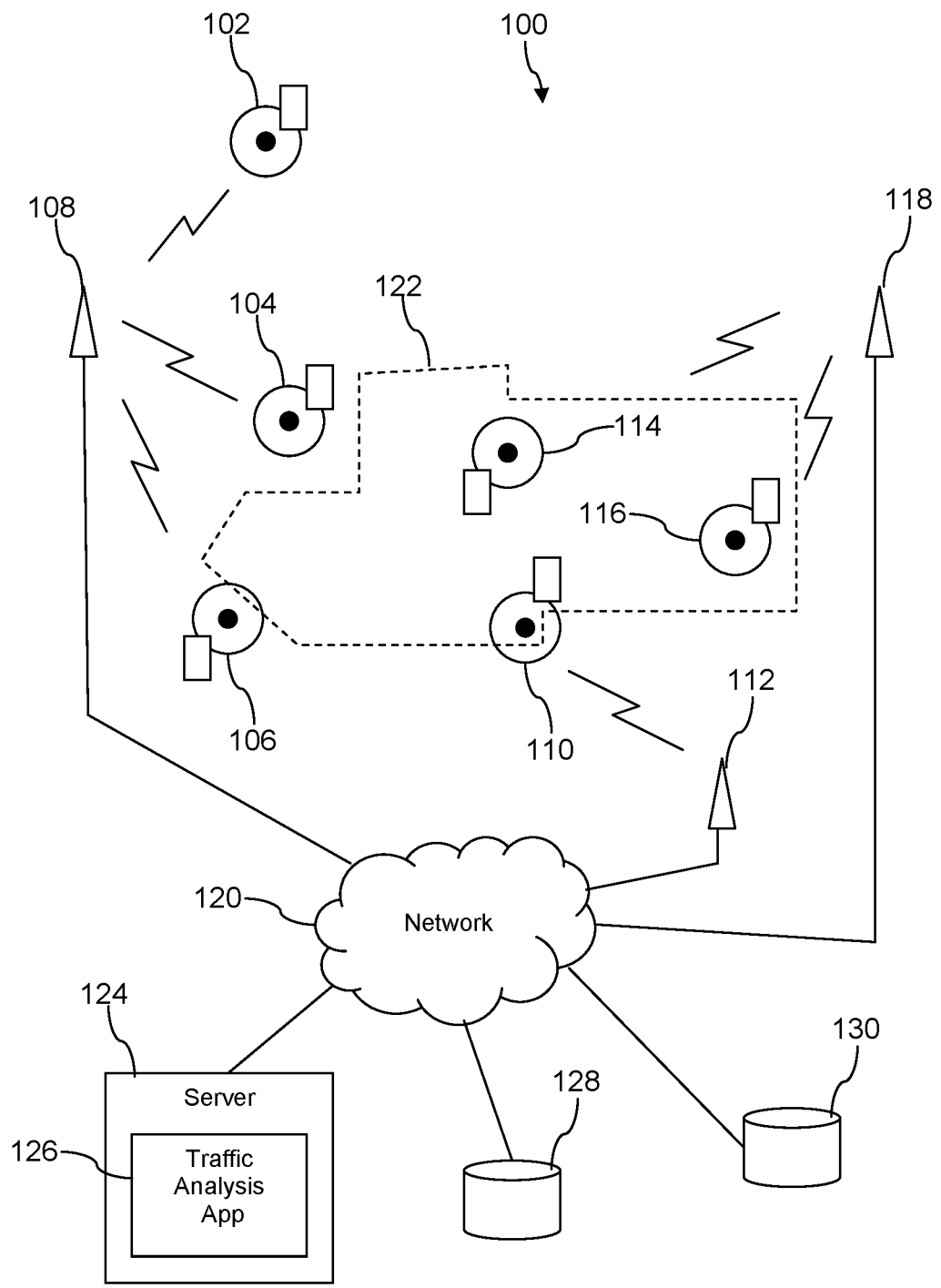
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Understanding patterns of foot traffic in buildings can provide valuable business insights—actionable intelligence that can improve success of business decisions. An enterprise considering adding a new retail outlet in an area may identify several candidate locations but not know which location would best serve their potential customers. An enterprise or small business that already has a business presence in a building may not know how to most effectively promote their business to the existing building foot traffic, because they do not understand the foot traffic in a comprehensive way. The present disclosure teaches an information technology (IT) system that leverages mobile communication device location fixes as a proxy for location of wireless communication subscribers (e.g., foot traffic, potential customers) to analyze foot traffic in buildings at different times during the day. In an embodiment, this information can be combined with automatically generated character signatures of these people. The result is a multi-dimensional map that defines a complex mesh of relationships or associations. This multi-dimensional map represents a considerable refinement and condensation of a vast quantity of data and makes these data points quickly accessible—makes that information actionable in real-time. In an embodiment, the multi-dimensional map comprises a presence dimension, a time dimension, a point-of-interest location geometry, and a character signature dimension.

The IT system further links the location data to demographic and behavioral information about the wireless communication subscribers and uses this further information to generate a survey or statistical picture of the foot traffic in the building with reference to time the traffic occurs, age of subscribers, educational level of subscribers, income level of subscribers, residence zip-code of subscribers, and other information. While this survey is anonymized to protect subscriber identities (names, phone numbers, residence information is not included in the summary), it still provides information that can help an enterprise select a build-out location from a plurality of candidates for a new retail outlet or that can help an enterprise or small business to understand how to better promote their business. The survey can be used by a business to staff floor workers at levels and at times that correspond well with actual foot traffic.

A definition of a location geometry can be provided by an organization (e.g., an enterprise or small business or other organization) that is stored in a metadata file amenable to computer processing. The location geometry may define a central point that is associated with the focus of a locational interest (e.g., within a sandwich shop on the ground floor of an office building) and a radius around that central point that serves as a perimeter for identifying foot traffic proximate to the central point. Alternatively, the location geometry may define a central point and a containing polygonal area of interest. In some embodiments, a plurality of organizations may each define location geometries in a metadata file associated with the organization, and the location geometries may at least partially overlap, for example when a plurality of organizations have a presence in the same building. The metadata file may be said to define a point-of-interest (POI) for an organization.

Mobile communication devices can determine and report their locations periodically to a central data store. The location fixes may be provided by mobile communication devices at latitude-longitude pairs, for example latitude-longitude coordinates determined by a GPS receiver of the mobile communication device.

Alternatively, locations of mobile communication devices can be determined by cell sites and those locations can be reported to the central data store. The location fixes may be determined by multi-lateration or trilateration of data from mobile communication devices collected from cell sites, for example signal strength data. The location fixes may be determined by substituting the location of a cell site to which the mobile communication device is attached to receive wireless communication coverage as a proxy for the location of the device. The location fixes may be determined by analyzing service set identifiers (SSIDs) of WiFi access points that the device detects, and using the known location of the WiFi access points as a proxy for the location of the device.

The location data of each device can be analyzed to create clusters of location data for that device, where each cluster is associated with a plurality of location fixes in relatively close proximity to each other in both location and in time. These clusters may be associated with places where the subscriber dwells for longer periods of time, for example in an office during the workday, in a residence during the evening, at a gym during the late-afternoon. Each cluster can be analyzed to identify a centroid that can be used to represent the cluster. Said in other words, a cluster and its centroid can act as a summary or proxy for the mobile communication device and further as a proxy for the location of the wireless communication subscriber associated with the mobile communication device. The centroid information can be analyzed to establish movement patterns of a subscriber, for example a route and time of commuting to work from a residence; a route and time of commuting to a residence from work; an arrival in a workplace; an arrival in a restaurant. This analysis, performed on location data of a plurality of different devices and associated subscribers, can be used to establish the movement patterns of those subscribers.

The location cluster centroid information associated with a plurality of wireless communication subscribers can be analyzed to determine if any of the centroids are located within the location geometries (POIs) defined by one or more metadata files of organizations. A computer application executing on a computer system can analyze this information. The application can collect information on correlations of centroids with location geometries and analyze the collected information to generate a summary or statistical survey of the movement (foot traffic) of wireless communication subscribers in one or more POIs. The application can access one or more data stores that comprise demographic information linked to the location centroids of the mobile communication device (e.g., using a phone number or a mobile equipment identity of the device as a reference into the data store) to associate demographic information to the centroids. The application can access one or more data stores that comprise behavioral information linked to the location centroids.

Thus, the application can identify how many people pass through a POI in each of 8 hours of interest; for each of the 8 hours of interest, provide information of the distribution of ages of the foot traffic, distribution of income of the foot traffic, distribution of educational level of the foot traffic, distribution of categories of behavior of the foot traffic, and other information. This summary or statistical survey can be provided to participating organizations or small businesses that may use the information to better manage their organization to accommodate the local foot traffic. The summary or statistical survey can be used to select a build-out location from a plurality of candidate locations, for example to build-out a premium fresh brewed coffee shop or to build-out a sandwich shop or to build-out a pastry shop.

In an embodiment, the application establishes a four dimensional map of information, where each dimension is associated with different information. The value at a point in this four dimensional map represents the coincidence of an identity of a wireless communication subscriber (e.g., presence of the subscriber), a location geometry definition, a character signature of the subscriber, and time. The character signature may be represented as an interest category of the subscriber and/or a demographic category of the subscriber. This four dimensional map refines or reduces to essential elements a vast complex of data and makes that data actionable quickly. For example, a restaurant having a specific location geometry defined in the application or system may note that the lunch business is lagging at an early part of the lunch period. It may dip into the system to find a select set of persons—including their contact information—who have an appropriate character signature, who customarily are located proximate to the location geometry of the restaurant, and send them a message prompt to entice them to visit the restaurant right then and there, thereby buoying the flagging lunch business on that specific day. This is one example of the efficiency promoted by building the multi-dimensional model described herein.

In an embodiment, the analysis of foot traffic (e.g., location centroids) with reference to POIs can be further elaborated by the application performing an attribution analysis when centroids could be allocated to more than one POI. For example, when a plurality of organizations or businesses are located proximately to each other (e.g., in an office tower) and a location centroid of a wireless communication subscriber dwells in the overlapping POIs of those organizations during an hour, what happened? Did the subscriber visit a sit-down restaurant located in the office tower or did the subscriber buy a new pair of shoes at a footwear retail outlet located in the office tower? The present disclosure contemplates a wide variety of different ways of arbitrating attribution of subscriber presence to POIs.

Attribution may be calculated by determining a fractional attribution to each of a plurality of possible POI attributions (e.g., the location centroid of a wireless communication subscriber was located in the geometries of each of the POIs), and an undivided attribution granted to the POI having the highest fractional attribution. Alternatively, fractional attributions may be summed up over units of time, and attribution assigned by rounding off the summed fractional attributions of each POI.

Attribution may be arbitrated, in part, based on a revenue of each candidate POI. For example, a first location that generates 10 times the daily revenue as the daily revenue generated by a second location may be allocated a greater fractional attribution than the second location, when a location centroid of a subscriber is present in both POIs. Attribution may be arbitrated, in part, based on a physical extent of each candidate POI. For example, a third location may have 10 times the floor space of a fourth location, and hence the third POI may be allocated a greater fractional attribution than the fourth location.

In an embodiment, attribution may be arbitrated, at least in part, based on dwell times associated with location centroids. For example, a dwell time of 15 minutes or less is compatible with visiting a sandwich shop in a building but is not compatible with visiting a sit-down restaurant located in the same building (e.g., 15 minutes is rarely enough time to sit down at a restaurant table, order a meal off the menu, have the ordered item cooked, eat the meal, checkout, and leave the restaurant). In an embodiment, a combination of the different attribution techniques identified above—attribution based on revenues, based on floor space, and based on dwell times—are used collaboratively by the application to determine location centroid attribution to POIs.

Turning now to FIG. 1, a communication system 100 is described. In an embodiment, the system 100 comprises a first cluster of location fixes 102, a second cluster of location fixes 104, and a third cluster of location fixes 106. Each of the clusters of location fixes 102, 104, 106 is associated with a corresponding mobile communication device that is provided wireless coverage by a first cell site 108. The system 100 further comprises a fourth cluster of location fixes 110 associated with a corresponding mobile communication device that is provided wireless coverage by a second cell site 112. The system 100 further comprises a fifth cluster of location fixes 114 and a sixth cluster of location fixes 116. Each of the clusters of location fixes 114, 116 is associated with a corresponding mobile communication device that is provided wireless coverage by a third cell site 118. Each of the clusters of location fixes 102, 104, 106, 110, 114, 116 is illustrated as a circle associated with a cluster centroid that is illustrated as a centrally located black dot and also associated with a mobile communication device (illustrated as a rectangle on the edge of the circle representing the cluster).

It will be appreciated that the mobile communication devices associated with at least some of the different clusters of location fixes 102, 104, 106, 110, 114, 116 may be the same mobile communication device (e.g., the same mobile communication device may be associated with the first cluster of location fixes 102 at a first time and also associated with the fifth cluster of location fixes 114 at a second later time). The cell sites 108, 112, 118 provide wireless communication links to mobile communication devices according to one or more of a long term evolution (LTE), a code division multiple access (CDMA), a global system for mobile communication (GSM), or a worldwide interoperability for microwave access (WiMAX) telecommunications protocol. The cell sites 108, 112, 118 are communicatively coupled to a network 120, whereby the mobile communication devices are enabled to communicate with other mobile communication devices and other devices communicatively coupled to the network 120, for example content distribution servers and application servers (not shown). The network 120 comprises one or more public networks, one or more private networks, or a combination thereof. The mobile communication devices are one of a mobile phone, a smart phone, a personal digital assistant (PDA), a headset computer, a wearable computer, a laptop computer, a tablet computer, or a notebook computer.

A point-of-interest (POI) geometry 122 may be defined by an organization such as an enterprise, a small business, a non-profit, a government office, or other organization. While the POI geometry 122 is depicted as a polygon, in other examples the POI geometry may be defined as a circle or ellipse or other shape. The POI geometry defines a perimeter of a region of interest. The POI geometry 122 may be defined by a metadata file stored in a data store 128 that is communicatively coupled to the network 120. The POI geometry 122 may be referred to as a predefined geometry in some contexts. The POI geometry 122 may be defined by a wireless communication service provider and may correspond to the general perimeter of a building, for example the perimeter of an office building.

A foot traffic analysis application 126 is stored in a memory of a computer system 124 and may be executed by a processor of the computer system 124. The application 126 is able to analyze the centroids of the clusters 102, 104, 106, 110, 114, 116 to determine which, if any, of the clusters, is present within the POI geometry 122 (e.g., intersects with the POI geometry 122). The application 126 is further able to analyze instances of centroids intersecting the POI geometry 122 to generate statistical summaries and/or statistical surveys of these intersections. The application 126 can associate mobile communication devices (e.g., based on phone number or mobile equipment identity associated with the devices) with demographic and behavioral data stored in a second data store 130. The demographic data may be provided by a third party unassociated with or unaffiliated with a wireless communication service provider who may operate the computer system 124 and the cell sites 108, 112, 118.

It is understood that the system 100 comprises any number of cell sites, any number of location clusters, any number of mobile communication devices, and any number of POI geometries 122. For ease of discussion, FIG. 1 illustrates a single POI geometry 122 which could be associated with a single office tower, but the present disclosure contemplates that the foot traffic analysis application 126 may perform its analysis on a very large number of different POI geometries located across a significant area, for example across a plurality of metropolitan areas of the United States, across a majority of a wireless communication coverage area of the wireless communication service provider, and/or in foreign countries.

As illustrated in FIG. 1, the first cluster of location fixes 102 and the second cluster of location fixes 104 are located outside of the POI geometry 122. The third cluster of location fixes 106 is partially located within the POI geometry 122, but its centroid falls outside of the POI geometry 122, and hence the application 126 deems the third location cluster 106 to not lie within or not to intersect with the POI geometry 122. The fourth location cluster 110 is partially located outside the POI geometry 122, but its centroid falls inside of the POI geometry 122, and hence the application 126 deems the fourth location cluster 110 to lie within or to intersect with the POI geometry 122. The fifth location cluster 114 and the sixth location cluster 116 lie entirely within the POI geometry 122, and hence the application 126 deems the fifth location cluster 114 and the sixth location cluster 116 to lie within or to intersect with the POI geometry 122. The application 126 counts three intersections of location clusters with the POI geometry 122. The location clusters 110, 114, 116 may be associated with the same mobile communication device. Alternatively, at least some of the location clusters 110, 114, 116 are associated with different mobile communication devices. The application 126 can identify a time the location clusters 110, 114, 116 intersect the POI geometry 122 and a dwell time of the location clusters 110, 114, 116 within the POI geometry 122. The dwell time may be the duration of time during which a mobile communication device remains within a location cluster, the time from initial entry into the location cluster to the time of first leaving the location cluster after initial entry into the location cluster. In an example, a mobile communication device may enter a location cluster associated with an office building at 9 AM, leave the location cluster at noon to go out to lunch, return to the location cluster at 1:30 PM and leave the location cluster at 5:30 PM to go home. In this example, two dwell times may be calculated, the first dwell time of 3 hours extending from 9 AM to noon and the second dwell time of 4 hours extending from 1:30 PM to 5:30 PM.

The application 126 uses a mobile communication identity associated with each of the location clusters that intersect the POI geometry 122 to look up demographic information and/or behavioral information associated with the devices in the second data store 130. The demographic information may be one or more of an age, an education level, an income level, a gender, a residential zip-code, a marital status, a number of children, and/or other demographic information. The behavioral information may be one or more of an interest category, an eating preference, and other behaviors. The application 126 can associate mobile communication devices (e.g., the subscribers associated with those devices) to special interest category (SIC) codes based on the behavioral information.

The application 126 can combine the location cluster intersection information with the demographic information and the behavioral information to generate a summary or survey for the POI geography 122. The summary or survey can indicate foot traffic in the POI geography 122 broken down per time of day; broken down by demographic quartiles, deciles, or centiles; broken down by gender; broken down by education level; broken down by income quartile, decile, and/or centile; broken down by behavioral category. The survey can report statistics of foot traffic in the POI geography 122. The survey can report statistics of foot traffic broken down to indicate distributions of foot traffic to different categories of characteristics. For example, the survey can report statistics of foot traffic distributed to different time of day categories, distributed to income categories, distributed to age categories, distributed to SIC codes, and/or distributed to dwell time category. The survey can indicate the count of traffic attributed to one or more organizations located within the POI geography 122.

Figure 2:
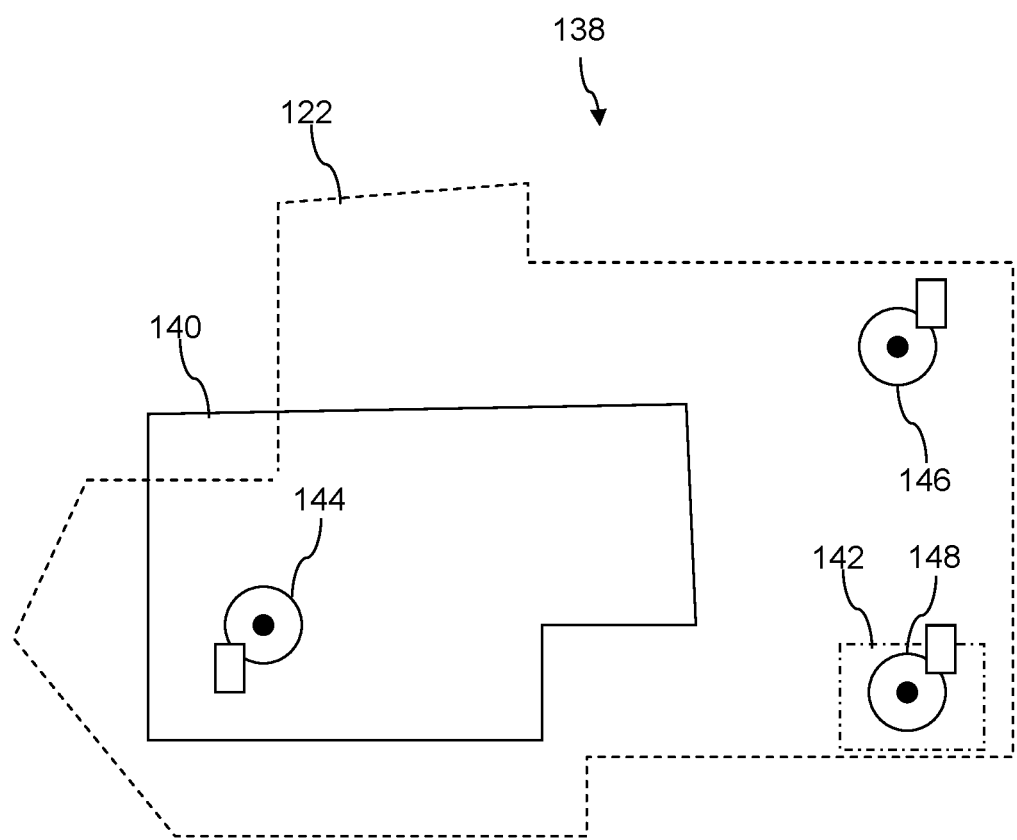
FIG. 2 is an illustration of point-of-interest (POI) geometry overlap according to an embodiment of the disclosure.

Turning now to FIG. 2, a set of POI geometries 138 is described. The POI geometry 122 of FIG. 1 is shown partially overlapping a second POI geometry 140 and wholly containing a third POI geometry 142. A seventh location cluster 144 is contained within the POI geometry 122 and the second POI geometry 140. An eighth location cluster 146 is contained within the POI geometry 122. A ninth location cluster 148 is located within the POI geometry 122 and the third POI geometry 142. The second POI geometry 140 may be associated with a first organization and the third POI geometry 142 may be associated with a second organization.

In an embodiment, a plurality of separate organizations are located within a building that is represented by the POI geometry 122. The application 126 can determine attribution of counts of subscriber traffic to different organizations located within the POI geometry 122 based on one or more factors. The application 126 can attribute traffic counts based on floor space of organizations, based on revenues of organizations earned within the building that is represented by the POI geometry 122, based on dwell time of devices compared to dwell time criteria defined by the organizations, based on matching WiFi SSIDs detected by the devices to WiFi SSIDs associated with the organizations, and/or based on other factors.

A first organization located within the building may have four times as much floor space in the building as a second organization located within the building. The traffic analysis application 126 may attribute 80% of the count of foot traffic (e.g., count of centroids of clusters deemed within the POI geometry 122) to the first organization and 20% of the foot traffic to the second organization. In some circumstances, the first and second organizations may define POI geometries that allow distinguishing when a centroid is in the POI geometry defined by the first organization from when a centroid is in the POI geometry defined by the second organization, but in many circumstances POI geometry cannot be defined so precisely or the resolution of the clusters of location fixes are not precise enough to support such precise analysis. The first organization may have ⅔ the revenues earned in the building as the second organization's revenues earned within the building. The traffic analysis application 126 may attribute 40% of the foot traffic to the first organization and 60% of the foot traffic to the second organization. The example described above is simple to promote ease of description, but the technical solution can be extended to cover circumstances where there are more than two organizations located within the same POI geometry.

The attribution of foot traffic within the POI geometry 122 may be performed using information provided in metadata files by the organizations. For example, the first organization may be open for business from noon to 7 PM while the second organization may be open for business from 7 AM to 10 AM. The attribution of foot traffic can take into account the time the foot traffic occurs to attribute counts to the first organization or to the second organization or to exclude counts to either organization, for example to exclude counts associated with centroids between 10 AM and noon from both organizations.

The metadata files provided by the organizations may specify a dwell time criteria for attributing intersection counts to the subject organization. For example, a third organization may be a sit-down restaurant and may define a minimum dwell time of 20 minutes as a criterion for attributing an intersection count to the third organization. A fourth organization may be a sandwich shop that features no tables for customers and serves customers who buy sandwiches for take-out. The fourth organization may define a maximum dwell time of 15 minutes as a criterion for attributing an intersection count to the fourth organization. It is understood that dwell time criterions may be used in combination with other criteria to determine attribution of counts.

The metadata files provided by the organizations may specify WiFi SSIDs for WiFi access points provided within the organization. The attachment of a mobile communication device to a WiFi SSID defined in the metadata file of an organization can be identified by analyzing data accessed from the second data store 130, for example records of WiFi SSIDs accessed by mobile communication devices. This data accessed from the second data store 130 may be used by the traffic analysis application 126 in some circumstances to allocate a count that may be eligible for attribution to multiple different organizations to the organization whose metadata file identifies the WiFi SSID as an attribution criteria.

Figure 3:
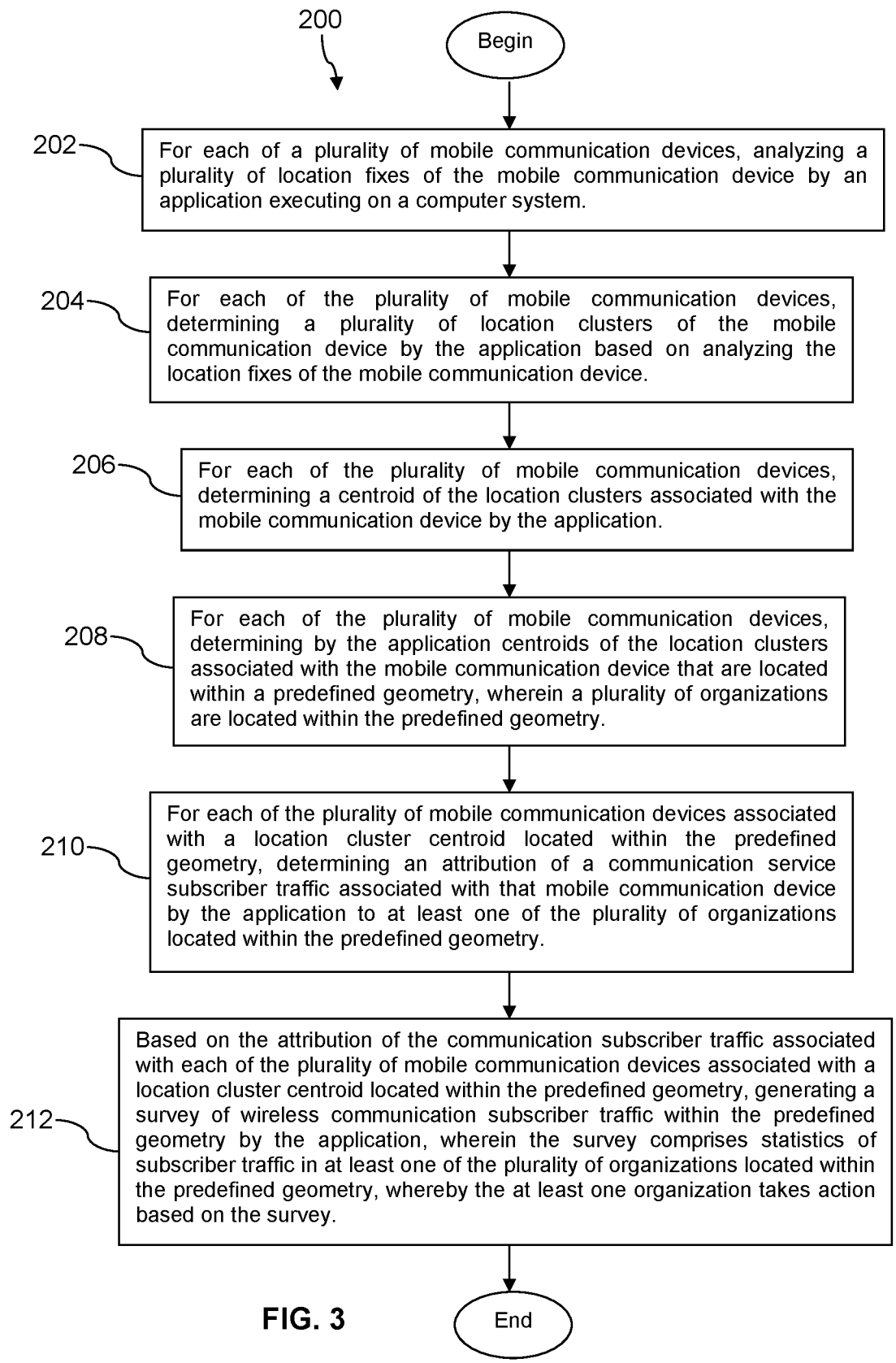
FIG. 3 is a flow chart of a method according to an embodiment of the disclosure.

Turning now to FIG. 3, a method 200 is described. At block 202, for each of a plurality of mobile communication devices, analyze a plurality of location fixes of the mobile communication device by an application executing on a computer system. At block 204, for each of the plurality of mobile communication devices, determine a plurality of location clusters of the mobile communication device by the application based on analyzing the location fixes of the mobile communication device. At block 206, for each of the plurality of mobile communication devices, determine a centroid of the location clusters associated with the mobile communication device by the application.

At block 208, for each of the plurality of mobile communication devices, determine by the application centroids of the location clusters associated with the mobile communication device that are located within a predefined geometry, wherein a plurality of organizations are located within the predefined geometry. At block 210, for each of the plurality of mobile communication devices associated with a location cluster centroid located within the predefined geometry, determine an attribution of a communication service subscriber traffic associated with that mobile communication device by the application to at least one of the plurality of organizations located within the predefined geometry. At block 212, based on the attribution of the communication subscriber traffic associated with each of the plurality of mobile communication devices associated with a location cluster centroid located within the predefined geometry, generate a survey of wireless communication subscriber traffic within the predefined geometry by the application, wherein the survey comprises statistics of subscriber traffic in at least one of the plurality of organizations located within the predefined geometry, whereby the at least one organization takes action based on the survey. The action may be deciding to build or expand a site office or store. The action may be establishing a staffing plan for a site office or store. The action may be composing and launching a promotional campaign.

Figure 4A:
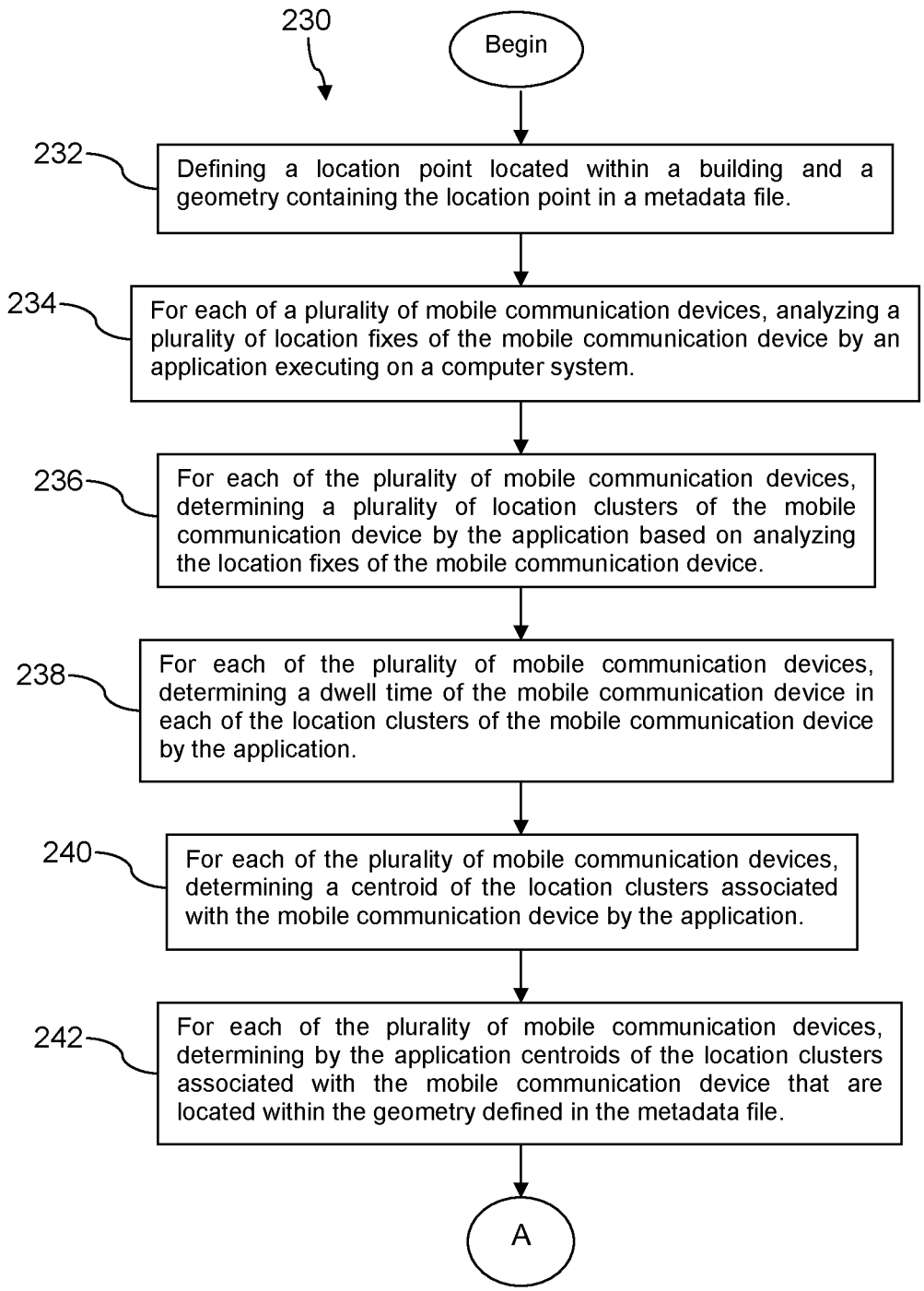
FIG. 4A and FIG. 4B is a flow chart of another method according to an embodiment of the disclosure.
Figure 4B:
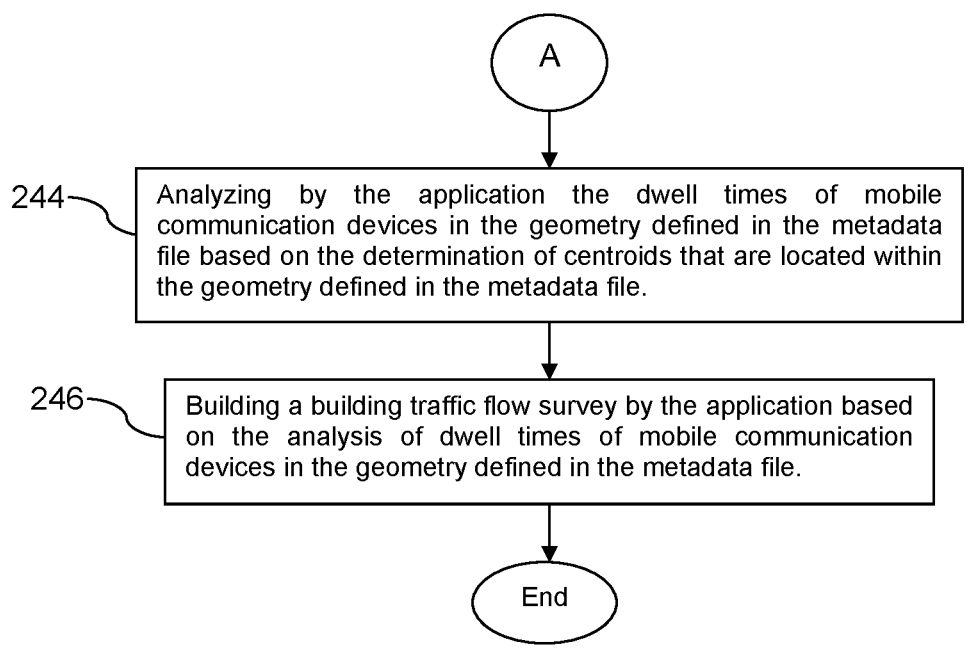

Turning now to FIG. 4A and FIG. 4B, a method 230 is described. At block 232, define a location point located within a building and a geometry containing the location point in a metadata file. At block 234, for each of a plurality of mobile communication devices, analyze a plurality of location fixes of the mobile communication device by an application executing on a computer system. At block 236, for each of the plurality of mobile communication devices, determine a plurality of location clusters of the mobile communication device by the application based on analyzing the location fixes of the mobile communication device.

At block 238, for each of the plurality of mobile communication devices, determine a dwell time of the mobile communication device in each of the location clusters of the mobile communication device by the application. At block 240, for each of the plurality of mobile communication devices, determine a centroid of the location clusters associated with the mobile communication device by the application. At block 242, for each of the plurality of mobile communication devices, determine by the application centroids of the location clusters associated with the mobile communication device that are located within the geometry defined in the metadata file.

At block 244, analyze by the application the dwell times of mobile communication devices in the geometry defined in the metadata file based on the determination of centroids that are located within the geometry defined in the metadata file. At block 246, build a building traffic flow survey by the application based on the analysis of dwell times of mobile communication devices in the geometry defined in the metadata file. The method 230 may further comprise taking some action based on the building traffic flow survey.

Figure 5:
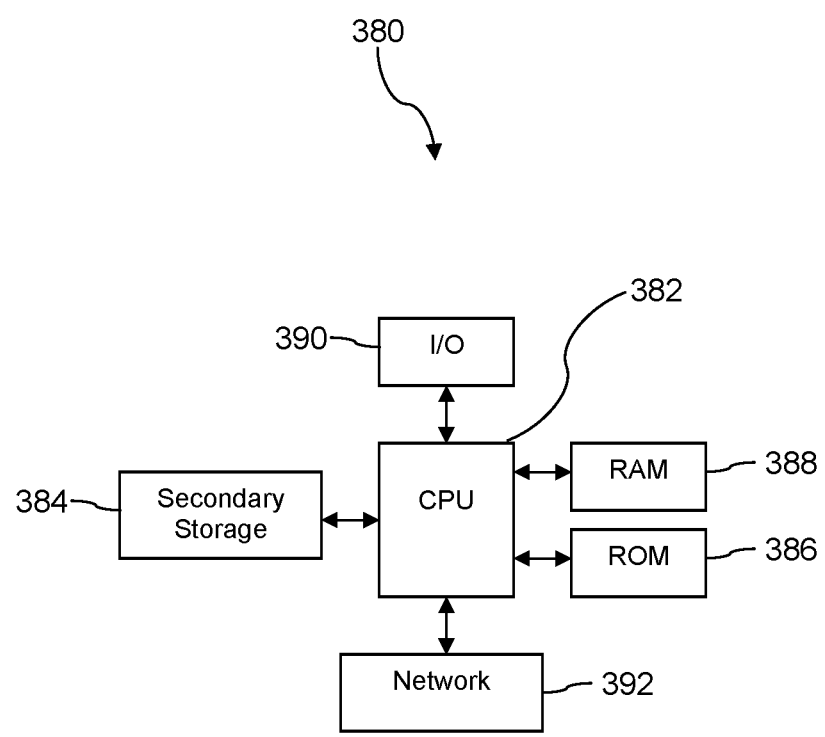
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of analyzing wireless communication service subscriber traffic and apportioning the traffic to proximate organizations located within a point of interest (POI) to build a multi-dimensional information map and condense a large amount of data to promote efficient use of the data, comprising:

for each of a plurality of mobile communication devices, analyzing a plurality of location fixes of the mobile communication device by an application executing on a computer system;

for each of the plurality of mobile communication devices, determining a plurality of location clusters of the mobile communication device by the application based on analyzing the location fixes of the mobile communication device;

for each of the plurality of mobile communication devices, determining a centroid of the location clusters associated with the mobile communication device by the application;

for each of the plurality of mobile communication devices, determining by the application centroids of the location clusters associated with the mobile communication device that are located within a predefined geometry, wherein a plurality of organizations are located within the predefined geometry;

for each of the plurality of mobile communication devices associated with a location cluster centroid located within the predefined geometry, determining an attribution of a communication service subscriber traffic associated with that mobile communication device by the application to at least one of the plurality of organizations located within the predefined geometry based on dwell times of the plurality of mobile communication devices within the predefined geometry, wherein a first mobile communication device of the plurality of mobile communication devices located within the predefined geometry is attributed to a first organization of the plurality of organizations based on a first dwell time of the first mobile communication device and a second mobile communication device of the plurality of mobile communication devices located within the predefined geometry is attributed to a second organization of the plurality of organizations based on a second dwell time of the second mobile communication device;

based on the attribution of the communication subscriber traffic associated with each of the plurality of mobile communication devices associated with a location cluster centroid located within the predefined geometry, generating a survey of wireless communication subscriber traffic within the predefined geometry by the application, wherein the survey comprises statistics of subscriber traffic in at least one of the plurality of organizations located within the predefined geometry, whereby the at least one organization takes action based on the survey; and transmitting the survey of wireless communication subscriber traffic within the predefined geometry to at least some of the plurality of organizations located within the predefined geometry.

2. The method of claim 1, wherein the predefined geometry is stored in a data store that is accessed by the application and the predefined geometry defines a perimeter.

3. The method of claim 2, wherein the predefined geometry defines the perimeter as a polygon, an ellipse, or a circle.

4. The method of claim 1, further comprising, for each of the plurality of mobile communication devices, determining a dwell time of the mobile communication device in each of the location clusters of the mobile communication device by the application, wherein the attribution of the communication subscriber traffic associated with each mobile communication device with a location cluster centroid located within the predefined geometry is based in part on the dwell time of the mobile communication device in the location clusters having centroids within the predefined geometry.

5. The method of claim 1, wherein the attribution of the communication subscriber traffic associated with each mobile communication device with a location cluster centroid located within the predefined geometry is based in part on a comparison among the revenues earned by the organizations located within the predefined geometry.

6. The method of claim 1, wherein the attribution of the communication subscriber traffic associated with each mobile communication device with a location cluster centroid located within the predefined geometry is based in part on a comparison among the areas occupied by the organizations within the predefined geometry.

7. The method of claim 1, wherein the statistics of subscriber traffic comprises at least one of distribution of traffic volume by time of day category, distribution of traffic volume by income category, distribution of traffic volume by age category, and distribution of traffic volume by dwell time category.

8. The method of claim 7, wherein the statistics of subscriber traffic are segregated by organization located within the predefined geometry based on the attribution of communication service subscriber mobile communication device to the organizations located within the predefined geometry.

9. A computer system for analyzing wireless communication service subscriber traffic and apportioning the traffic to proximate organizations located within a point of interest (POI), comprising:

a processor;

a memory; and an application stored in the memory that, when executed by the processor;

for each of a plurality of mobile communication devices, analyzes a plurality of location fixes of the mobile communication device, for each of the plurality of mobile communication devices, determines a plurality of location clusters of the mobile communication device based on analyzing the location fixes of the mobile communication device, for each of the plurality of mobile communication devices, determines a centroid of the location clusters associated with the mobile communication device, for each of the plurality of mobile communication devices, determines centroids of the location clusters associated with the mobile communication device that are located within a predefined geometry, wherein a plurality of organizations are located within the predefined geometry;

for each of the plurality of mobile communication devices associated with a location cluster centroid located within the predefined geometry, determines an attribution of a communication service subscriber traffic associated with that mobile communication device to at least one of the plurality of organizations located within the predefined geometry based on dwell times of the plurality of mobile communication devices within the predefined geometry, wherein a first mobile communication device of the plurality of mobile communication devices located within the predefined geometry is attributed to a first organization of the plurality of organizations based on a first dwell time of the first mobile communication device and a second mobile communication device of the plurality of mobile communication devices located within the predefined geometry is attributed to a second organization of the plurality of organizations based on a second dwell time of the second mobile communication device, based on the attribution of the communication subscriber traffic associated with each of the plurality of mobile communication devices associated with a location cluster centroid located within the predefined geometry, generates a survey of wireless communication subscriber traffic within the predefined geometry, wherein the survey comprises statistics of subscriber traffic in at least one of the plurality of organizations located within the predefined geometry, whereby the at least one organization takes action based on the survey, and transmits the survey of wireless communication subscriber traffic within the predefined geometry to at least some of the plurality of organization located within the predefined geometry.

10. The computer system of claim 9, wherein the mobile communication devices are selected from the group consisting of mobile phones, personal digital assistants (PDAs), smart phones, wearable computers, headset computers, laptop computers, tablet computers, and notebook computers.

11. The computer system of claim 9, wherein the location fixes comprise latitude-longitude pairs provided by the mobile communication devices.

12. The computer system of claim 9, wherein the location fixes are determined by trilateration based on data collected from cell sites.

13. The computer system of claim 9, wherein the predefined geometry defines the perimeter as a polygon, an ellipse, or a circle.

14. The computer system of claim 9, wherein the application determines the attribution of the communication service subscriber traffic associated with the mobile communication devices at least in part based on a definition of characteristics of at least some of the organizations located within the predefined geometry, wherein the information comprises at least one of revenues of an organization earned within the predefined geometry, a special interest category (SIC) code associated with an organization located within the predefined geometry, hours of service of an organization located within the predefined geometry, and a WiFi SSID of a WiFi access point located within the organization located within the predefined geometry.

15. A method of analyzing location data of mobile communication devices to produce building traffic flow survey, comprising:

defining a location point located within a building and a geometry containing the location point in a metadata file;

for each of a plurality of mobile communication devices, analyzing a plurality of location fixes of the mobile communication device by an application executing on a computer system;

for each of the plurality of mobile communication devices, determining a plurality of location clusters of the mobile communication device by the application based on analyzing the location fixes of the mobile communication device;

for each of the plurality of mobile communication devices, determining a dwell time of the mobile communication device in each of the location clusters of the mobile communication device by the application;

for each of the plurality of mobile communication devices, determining a centroid of the location clusters associated with the mobile communication device by the application;

for each of the plurality of mobile communication devices, determining by the application centroids of the location clusters associated with the mobile communication device that are located within the geometry defined in the metadata file;

analyzing by the application the dwell times of mobile communication devices in the geometry defined in the metadata file based on the determination of centroids that are located within the geometry defined in the metadata file wherein a first mobile communication device of the plurality of mobile communication devices located within the geometry is given a first treatment based on a first dwell time of the first mobile communication device and a second mobile communication device of the plurality of mobile communication devices located within the geometry is given a second treatment based on a second dwell time of the second mobile communication device;

building a building traffic flow survey by the application based on the analysis of dwell times of mobile communication devices in the geometry defined in the metadata file, and transmitting the building traffic flow survey to an organization located within the geometry.

16. The method of claim 15, wherein the metadata file further defines dwell time criteria for at least some of a plurality of organizations located within the geometry defined by the metadata file and wherein analyzing the dwell times of mobile communication devices by the application comprises comparing the dwell times to the dwell time criteria for the plurality of organizations.

17. The method of claim 16, wherein the traffic flow survey provides a count of traffic to each of the organizations located within the geometry that are associated with a dwell time criterion.

18. The method of claim 15, wherein the metadata file identifies hours of service of at least some of a plurality of organizations located within the geometry defined by the metadata file and wherein the application further analyzes the dwell times of mobile communication devices by comparing a time associated with the centroids of the location clusters associated with the mobile communication devices that are located within the geometry defined in the metadata file with the identified hours of service.

19. The method of claim 15, wherein the metadata file identifies WiFi SSIDs of WiFi access points located in at least some of a plurality of organizations located within the geometry defined by the metadata file, further comprising the application comparing WiFi SSIDs identified by mobile communication devices associated with centroids of location clusters located within the geometry defined in the metadata file to the WiFi SSIDs identified in the metadata file.

20. The method of claim 15, wherein the mobile communication devices are selected from the group consisting of mobile phones, personal digital assistants (PDAs), smart phones, wearable computers, headset computers, laptop computers, tablet computers, and notebook computers.

* * * * *